US011313427B2

(12) United States Patent
Krause et al.

(10) Patent No.: US 11,313,427 B2
(45) Date of Patent: Apr. 26, 2022

(54) SECURING DEVICE FOR SECURING A SIGNAL CABLE

(71) Applicant: KNORR-BREMSE Systeme fuer Nutzfahrzeuge GmbH, Munich (DE)

(72) Inventors: Oliver Krause, Wolfratshausen (DE); Matthias Klingner, Moorenweis (DE); Manfred Schoenauer, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 126 days.

(21) Appl. No.: 16/151,001

(22) Filed: Oct. 3, 2018

(65) Prior Publication Data

US 2019/0032739 A1 Jan. 31, 2019

Related U.S. Application Data

(63) Continuation of application No. PCT/EP2017/057851, filed on Apr. 3, 2017.

(30) Foreign Application Priority Data

Apr. 4, 2016 (DE) ............ 10 2016 106 099.2

(51) Int. Cl.
*F16D 66/02* (2006.01)
*B60T 17/22* (2006.01)
(Continued)

(52) U.S. Cl.
CPC ............ *F16D 66/021* (2013.01); *B60T 17/04* (2013.01); *B60T 17/22* (2013.01); *F16D 55/226* (2013.01);
(Continued)

(58) Field of Classification Search
CPC .. F16D 66/021; F16D 65/0974; F16D 55/226; F16D 2055/0016; B60T 17/22
See application file for complete search history.

(56) References Cited

U.S. PATENT DOCUMENTS 4,183,012 A * 1/1980 Kimura ................. F16D 66/024
188/1.11 L
4,677,420 A * 6/1987 Topic ..................... F16D 66/021
340/454
(Continued)

FOREIGN PATENT DOCUMENTS

CN 102918293 A 2/2013
CN 103423517 A 12/2013
(Continued)

OTHER PUBLICATIONS

Chinese-language Office Action issued in counterpart Chinese Application No. 201780026738.7 dated Jul. 22, 2019 with English translation (10 pages).
(Continued)

*Primary Examiner* — Vishal R Sahni
(74) *Attorney, Agent, or Firm* — Crowell & Moring LLP

(57) ABSTRACT

A securing device secures at least one signal cable to a pad retainer bracket of a disc brake, wherein the disc brake has a pad retainer bracket that is secured to a brake caliper of the disc brake spanning a brake disc. The securing device has a retainer that can be arranged on the pad retainer bracket. The signal cable is retained in the retainer, wherein the retainer is also interlockingly and/or frictionally retained on one side in a lateral region of the pad retainer bracket. The signal cable is guided between the retainer and the associated side of the pad retainer bracket.

10 Claims, 4 Drawing Sheets

(51) Int. Cl.
*F16D 55/226* (2006.01)
*F16D 65/097* (2006.01)
*B60T 17/04* (2006.01)
*F16D 55/00* (2006.01)

(52) U.S. Cl.
CPC .. *F16D 65/0974* (2013.01); *F16D 2055/0016* (2013.01)

(56) References Cited

U.S. PATENT DOCUMENTS

| | | | |
|---|---|---|---|
| 4,742,326 A * | 5/1988 | Gregoire | F16D 65/0977 188/1.11 L |
| 5,513,726 A * | 5/1996 | Thompson | F16D 66/021 188/1.11 L |
| 2013/0068573 A1 | 3/2013 | Freund et al. | |
| 2015/0041258 A1* | 2/2015 | Asen | F16L 3/00 188/1.11 L |
| 2016/0061278 A1* | 3/2016 | Fischl | F16D 65/0006 188/73.38 |
| 2016/0146278 A1* | 5/2016 | Roberts | F16D 55/226 188/73.38 |

FOREIGN PATENT DOCUMENTS

| | | |
|---|---|---|
| CN | 104350301 A | 2/2015 |
| DE | 43 40 452 A1 | 6/1995 |
| DE | 10 2005 060 551 A1 | 6/2007 |
| DE | 102005060551 * | 6/2007 |
| DE | 10 2011 012 271 B3 | 6/2012 |
| DE | 102011012271 * | 6/2012 |
| DE | 10 2012 009 841 A1 | 11/2013 |
| DE | 10 2012 106 424 A1 | 1/2014 |
| DE | 102012106424 * | 1/2014 |
| EP | 0 190 705 A2 | 8/1986 |
| EP | 2112397 * | 10/2009 |
| EP | 2 112 397 B1 | 8/2013 |
| EP | 3690272 * | 8/2020 |
| WO | WO 2008/060392 A2 | 5/2008 |

OTHER PUBLICATIONS

International Search Report (PCT/ISA/210) issued in PCT Application No. PCT/EP2017/057851 dated Jun. 12, 2017 with English translation (eight (8) pages).

German-language Written Opinion (PCT/ISA/237) issued in PCT Application No. PCT/EP2017/057851 dated Oct. 12, 2017 (five (5) pages).

International Preliminary Report on Patentability (PCT/IB/326 & PCT/IB/373) issued in PCT Application No. PCT/EP2017/057851 dated Oct. 18, 2018, including English translation of document C2 (German-language Written Opinion (PCT/ISA/237)) previously filed on Oct. 3, 2018 (eight pages).

\* cited by examiner

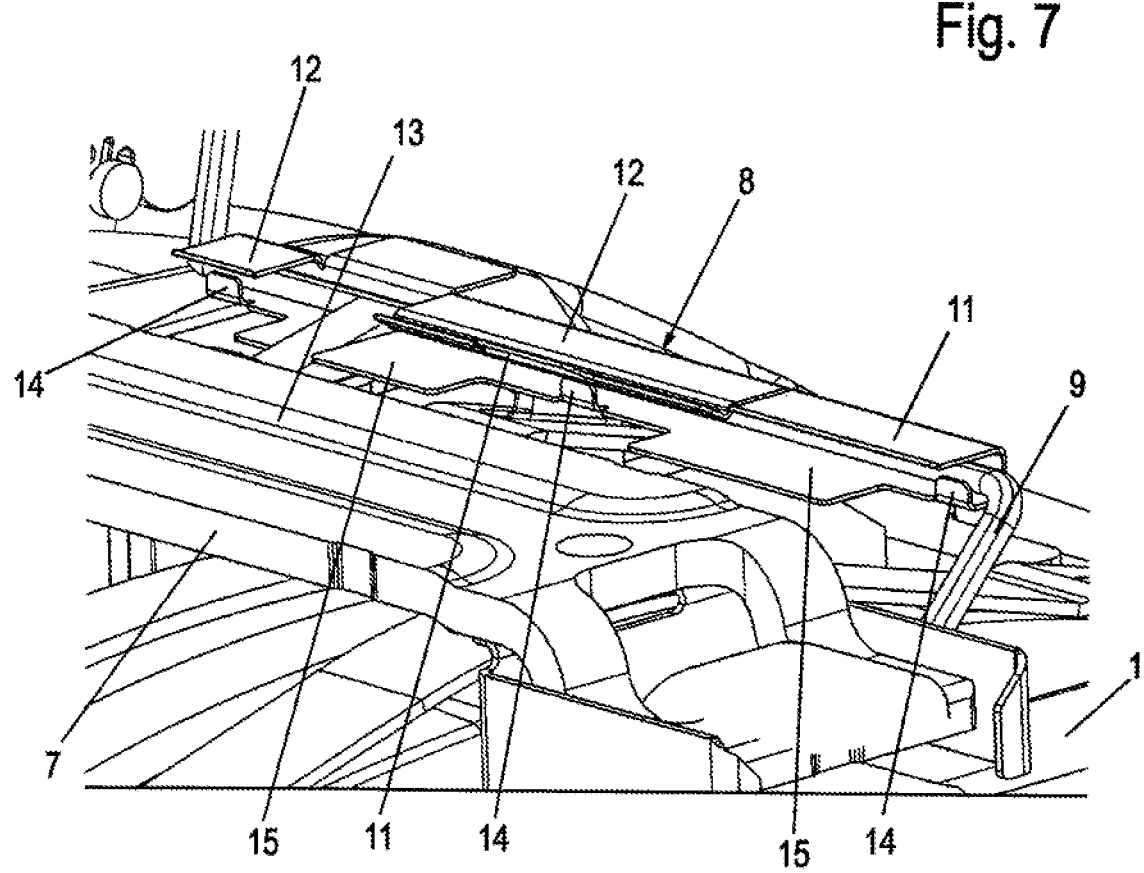
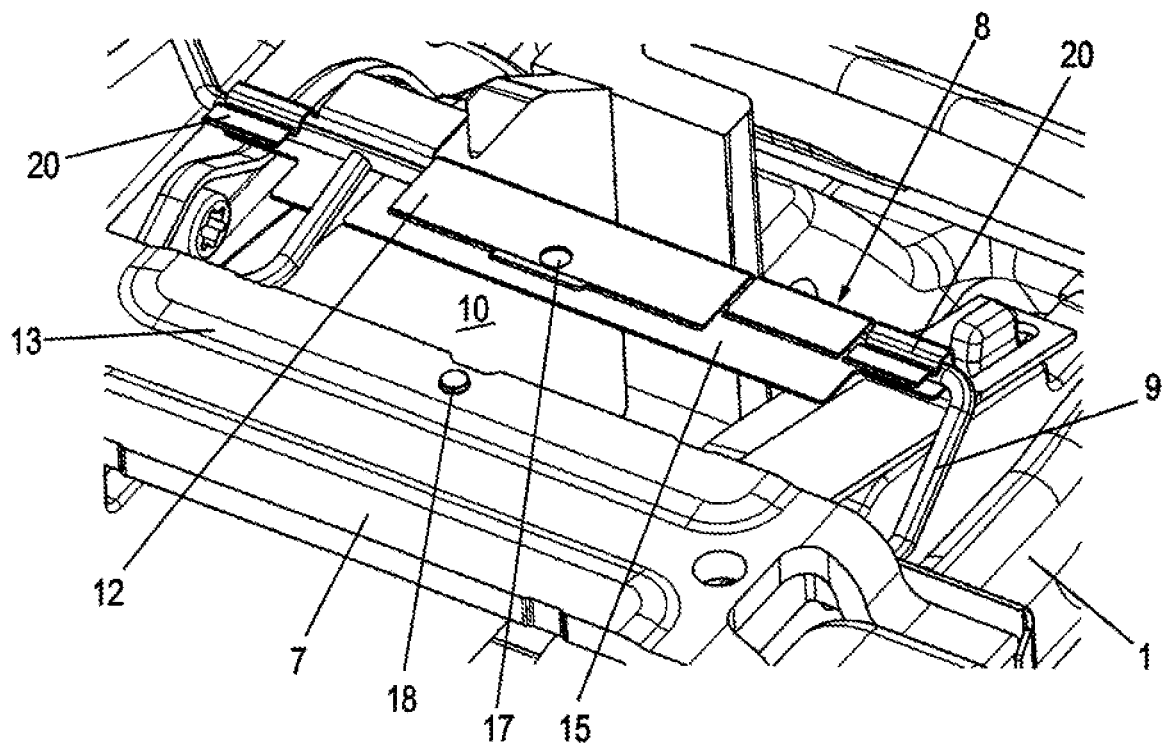

SECURING DEVICE FOR SECURING A SIGNAL CABLE

CROSS REFERENCE TO RELATED APPLICATIONS

This application is a continuation of PCT International Application No. PCT/EP2017/057851, filed Apr. 3, 2017, which claims priority under 35 U.S.C. § 119 from German Patent Application No. 10 2016 106 099.2, filed Apr. 4, 2016, the entire disclosures of which are herein expressly incorporated by reference.

BACKGROUND AND SUMMARY OF THE INVENTION

The invention relates to the securing device for securing a signal cable to a pad retainer bracket of a disc brake.

Signal cables—especially those designed as at least one or more single-conductor cables or as a multi-conductor cable—are known for monitoring the wear and, especially, for determining a permissible wear limit of a respective friction pad of brake pads. These cables are part of a brake pad wear detection device. For this, wear sensors connected to the signal cable are, in one simple exemplary layout, embedded by way of example in regions of the friction pad. When a wear limit is reached due to a brake disc, which is in contact with the friction pad during a braking event, grinding down the brake pad, an electric pulse is generated, which is relayed across the associated signal cable to an electronics unit for evaluation and possibly sending of a warning signal.

The at least one signal cable is fastened to the brake caliper both for protection and to prevent uncontrolled movements, especially during driving-related vibrations. For this purpose, a retainer is provided, in which the signal cable is led, and which is connected by positive locking to a pad retainer bracket which spans a mounting opening of the brake caliper.

A securing device of this kind is disclosed in EP 2 112 397 B1, having a retainer made of sheet metal, which substantially covers the pad retainer bracket and has clamping clips for the firm positioning on the pad retainer bracket, engaging with the pad retainer bracket in such a way that the retainer is secured.

The signal cable here is led in tabs molded onto the retainer, which are braced against the top side of the pad retainer bracket.

A comparable design can be found in WO 2008/060392 A2. The retainer known from this document covers the pad retainer bracket, and the signal cable is likewise led between the retainer and the pad retainer bracket.

The drawback to the solutions known thus far is the relatively high material usage for the retainer, as well as its difficult securing on the pad retainer bracket, which prevents an optimized manufacturing process.

This circumstance also takes on special importance because ready assembled disc brakes, i.e., those including a signal cable fastened on the pad retainer bracket, are produced in large numbers as series manufactured parts.

Besides the difficult mounting of the retainer, a dismounting is also difficult, since the clamping clips of the retainer engaging in clamping fashion on both sides, i.e., on the two longitudinal sides of the pad retainer bracket, need to be bent open in order to loosen and replace the signal cable.

The problem which the invention proposes to solve is to modify the securing device of the generic kind so that it is easier and cheaper to produce and install.

This problem is solved by a securing device according to the invention. A securing device is created for securing at least one signal cable to a pad retainer bracket of a disc brake, having a retainer that is arranged on the pad retainer bracket, while the signal cable is led in the retainer. The retainer is arranged in this case at one side on a side region of the pad retainer bracket and retained on it by positive locking and/or friction locking, the signal cable being led between the retainer and the associated side of the pad retainer bracket.

The invention furthermore creates a combination of a pad retainer bracket of a disc brake and a securing device, as well as a disc brake with a securing device.

The securing device according to the invention and the corresponding disc brake each offer a whole series of benefits as compared to the prior art. These include, in particular, very low material usage. Preferably, a sheet metal will be used, which is appropriately configured by a forming process.

The pad retainer bracket may completely span the mounting opening.

Alternatively, it also can span the mounting opening not completely, especially axially, but rather be secured only at one side on the brake caliper. It then acts preferably radially on only one of the two brake pads to secure it.

Advantageously, the retainer runs parallel to the longitudinal direction of the pad retainer bracket, i.e., parallel to an axis of rotation of a brake disc of the disc brake. Preferably in this respect it has areas which are U- or C-shaped in cross section, forming an upper side leg and, running parallel to it at a distance therefrom, a lower side leg, which rest against the pad retainer bracket. In this way, two oppositely situated side legs are advantageously formed, forming resilient clamping clips, which legs engage the pad retainer bracket by positive locking and/or friction locking, preferably by positive locking.

These side legs form the side boundary for the guidance of the signal cable, which is thus arranged advantageously and compactly between an associated narrow side of the pad retainer bracket and a web of the retainer which joins the two clamping legs to each other in the spanning direction of the pad retainer bracket.

Usually the pad retainer bracket is provided with elevations or webs bordering the two long edges, so that a crimp is formed between them. Thus, mating parts are present for the positive locking with the retainer, whose clamping legs engage across these elevations and thus form at least one displacement lock acting transversely to the spanning direction.

But it is also contemplated to advantageously configure the pad retainer bracket simply so that mating positive locking devices are provided. The corresponding design of the pad retainer bracket is economical, so that a reduction of the manufacturing costs is also not significantly adversely affected by this measure.

In this context it should be mentioned that, with a corresponding design of the retainer, still having the full functionality, a material savings of up to 60% can be achieved as compared to a retainer of the prior art.

The retainer may also be secured on a pad retainer bracket formed from a bent wire bracket, rather than a strip shape, having two wire legs arranged parallel to and spaced apart from each other, spanning the mounting opening.

According to the invention, the retainer is then fastened on one side on one wire leg, the wire bracket, i.e., the wire legs, being polygonal, round, or nonround in cross section. For a round cross section, the associated wire leg and/or the retainer should be modified so that a positive locking is made possible, and the retainer is held securely both in the spanning direction of the pad retainer bracket and transversely to this direction.

Besides the manufacturing costs being reduced significantly as compared to the prior art owing to the slight material input, a cost reduction also results from a simplified assembly, which is possible on account of the inventive configuration of the securing device.

In order to arrange the retainer on the pad retainer bracket it is only necessary to press the retainer sideways onto the pad retainer bracket, which can be done without tools, i.e., manually, by simply spreading apart the clamping legs.

For this, the oppositely situated side legs can be provided with insertion tapers, which form, i.e., bound, a funnel-shaped insertion slot of the retainer.

The benefits resulting from the simplified mounting likewise occur during a dismounting of the retainer for purposes of its replacement, when a wear sensor connected to the signal cable and positioned in a friction pad of a brake pad has to be replaced on account of wear.

According to another idea of the invention, the signal cable and the retainer are pre-assembled to form a structural unit, thereby significantly simplifying the mounting of the retainer.

In order to ensure a secure fixation of the signal cable in the retainer from the prior manufacturing to the mounting on the pad retainer bracket, the retainer can be provided with angled locking tabs formed in its interior, especially by punching, which clamp and hold the signal cable. Furthermore, the locking tabs form an end stop for the pad retainer bracket, so that a displacement of the retainer transversely to the longitudinal extension of the pad retainer bracket and thus a clamping of the signal cable is prevented, such as would otherwise be possible under the correspondingly acting forces.

Moreover, this achieves a kind of pre-centering of the signal cable, which is advantageous in that an additional component which is fastened on the pad retainer bracket, as in the prior art, is not needed.

Also especially advantageous is an embodiment of the disc brake with a brake caliper having a mounting opening for the brake pads, wherein the pad retainer bracket has a substantially flattened shape in cross section perpendicular to its longitudinal direction, preferably parallel to the axis of rotation, especially the shape of a (flat) rectangle, with two short sides and two long sides. The longitudinal direction of the pad retainer bracket lies parallel with an axis of rotation of the brake disc. The signal cable is led and secured between the retainer and an associated short side of the flat pad retainer bracket in cross section. Preferably, the long sides of the pad retainer bracket are situated tangential to the brake disc axis of rotation or imaginary circles concentric to it and the short sides lie substantially radial to the axis of rotation. In this way, the signal cable lies well protected in space-saving manner on the pad retainer bracket and on its retainer.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 7 is a perspective top view of the variant embodiment of FIG. 6.

FIG. 8 is another exemplary embodiment of the retainer, likewise in a perspective top view.

DETAILED DESCRIPTION OF THE DRAWINGS

Figure 1:
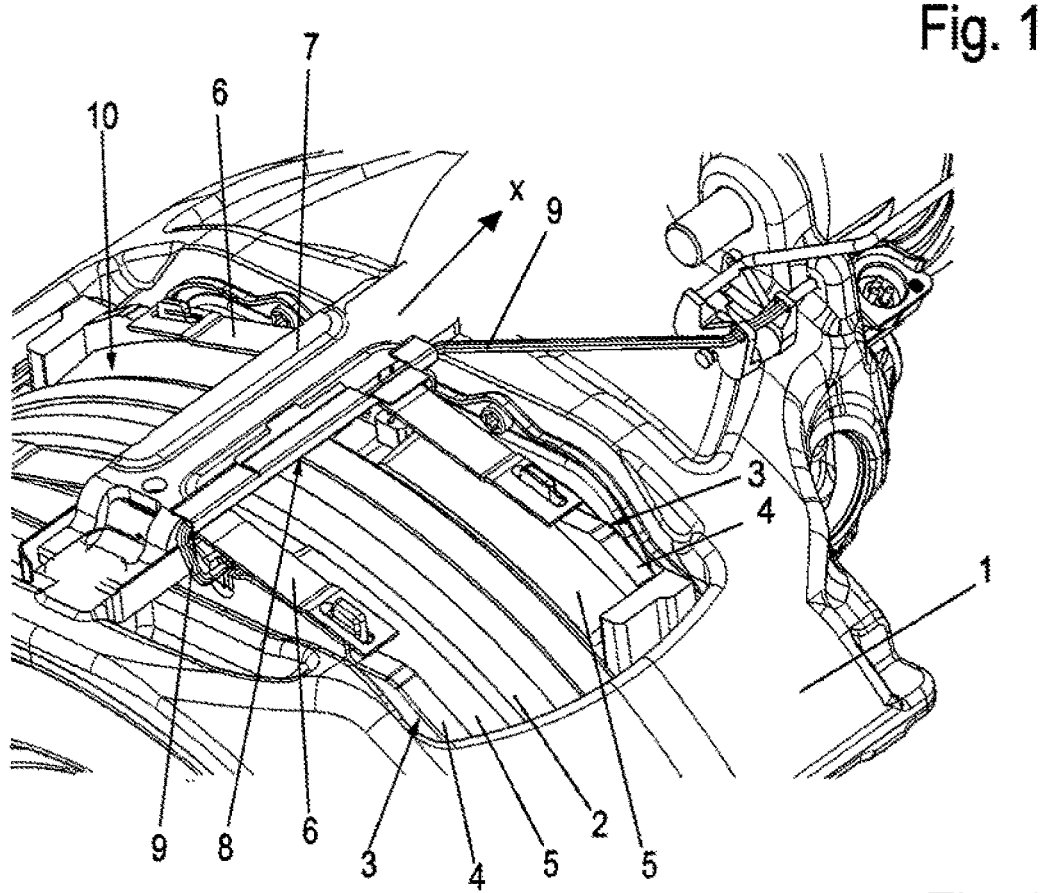
FIGS. 1 and 2 are different perspective top views of a portion of a disc brake illustrating an exemplary embodiment of a securing according to the invention.
Figure 2:
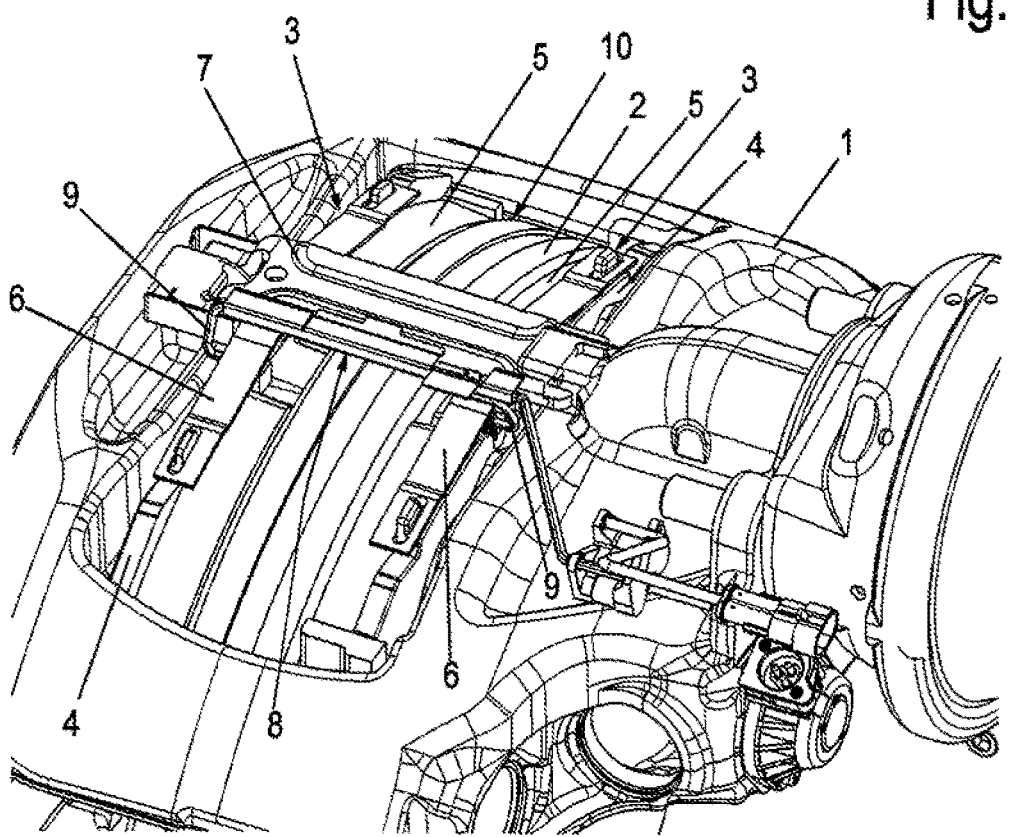

FIGS. 1 and 2 respectively show in a cutout view a disc brake—especially one intended for use in a commercial vehicle.

The disc brake comprises a brake caliper 1. The caliper engages across a brake disc 2 arranged rotatably on the vehicle side. In the brake caliper 1 are arranged two brake pads 3, each having a pad support plate 4 and a friction pad 5 connected thereto, being positioned on either side of the brake disc 2. During a braking event, the friction pads 5 and the rotatable brake disc 2 come into frictional contact with each other, so that the brake disc 2 and thus the vehicle are braked.

Especially for the mounting or dismounting of the brake pads 3, the brake caliper 1 has a preferably circumferentially closed mounting opening 10.

This mounting opening 10 is spanned or bridged by a pad retainer bracket 7 held directly or indirectly on the brake caliper 1, against which pad retaining springs 6 press here, these being arranged on the pad support plates 4, carrying the friction pads 5, of the brake pads 3.

The pad retainer bracket 7 may completely span the mounting opening 10, especially in parallel with the axis of rotation of the brake disc. Alternatively, it may also not completely span the mounting opening 10, but instead only be secured on one side on the brake caliper 1 (not shown). It then also lies preferably parallel to the axis of rotation of the brake disc. It then acts preferably radially on only the one of the two brake pads 3 in a securing manner. The invention may also be implemented on such a pad retainer bracket 7. The other brake pad is then otherwise secured radially. The brake pads 3 are held preferably in pad shafts of a brake carrier. The brake caliper 1 is preferably a sliding caliper. The brake pads can preferably be inserted through the mounting opening into the brake carrier 1.

In order to identify the wear on the friction pads 5 resulting from braking events, a wear sensor (not shown here) is integrated in each of the brake pads. A signal cable 9 is connected to each wear sensor. At least one of the signal cables 9 is laid across the mounting opening 10 and led to a brake pad wear detecting and indicating device (not shown here) of the disc brake.

The signal cable 9 is led through a retainer 8, which is held at one side in the spanning direction X of the pad retainer bracket 7 in positive locking and/or friction locking fashion on the bracket. The pad retainer bracket 7 has substantially a flattened shape, especially the shape of a (flat) rectangle, in cross section perpendicular to its longitudinal direction or perpendicular to the spanning direction X. The spanning direction X and the longitudinal direction of the pad retainer bracket 7 lie parallel to the axis of rotation of the brake disc 2.

The retainer 8 is accordingly arranged on one side at a lateral region of the pad retainer bracket 7 and is held thereon by positive locking and/or friction locking. The signal cable 9 is led between the retainer 8 and an associated side of the pad retainer bracket 7. "Lateral" or "side" means here the short sides of the rectangular cross section of the pad retainer bracket 7.

Figure 5:
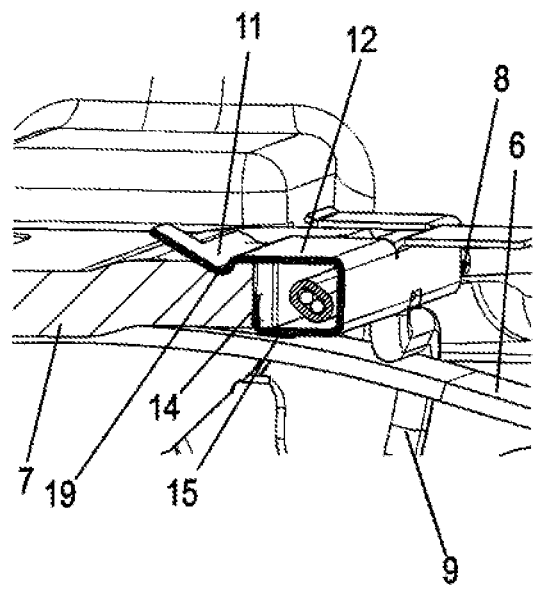
FIGS. 4 and 5 are respective exemplary embodiments of a retainer in a cross section.
Figure 4:
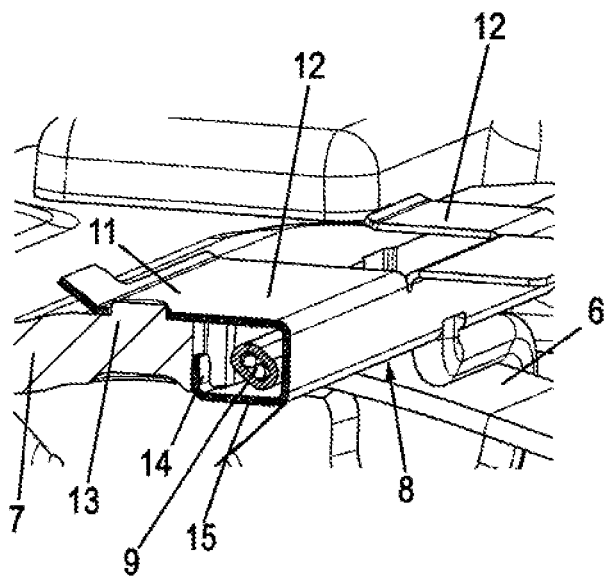
Figure 3:
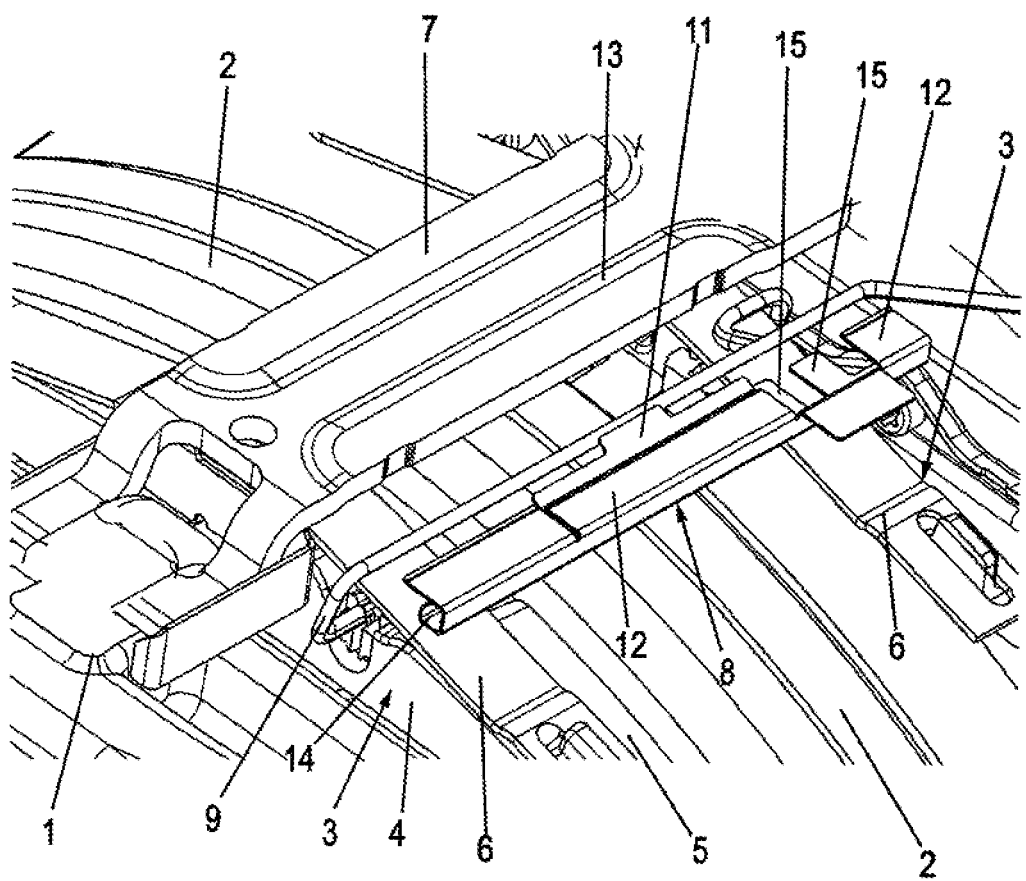
FIG. 3 is an enlarged view of the portion of FIG. 1 in a preassembled position of the retainer.

Such a retainer 8 is shown enlarged in FIGS. 3-5.

It may be noticed here that the retainer 8 in the example has a U-shaped cross section, with two side legs 12, 15 running parallel and spaced apart from each other, one upper side leg 12 resting against the side of the pad retainer bracket 7 facing away from the pad retaining spring 6, while the lower side leg 15 is braced against the opposite situated, i.e., the lower side of the pad retainer bracket 7.

In the example, a clamping leg 11 is molded on a partial region of the upper side leg 12, which in the embodiment shown in FIG. 4 engages across a web 13 of the pad retainer bracket 7, so that a displacement lock for the retainer 8 is produced transversely to the longitudinal extension of the pad retainer bracket 7.

The at least one web 13 extends in the direction of longitudinal extension of the pad retainer bracket 7 at least across a portion of the length of the pad retainer bracket 7 and protrudes beyond it. The direction of the longitudinal extension corresponds to the spanning direction X. This preferably lies parallel with the axis of rotation of the brake disc 2.

A free edge region of the clamping leg 11 of the retainer 8 is fashioned as an insertion taper, so that the clamping leg 11 can easily slide across the web 13 when mounting the retainer 8. When dismounting the retainer 8, the insertion taper of the clamping leg 11 serves for applying a suitable tool, such as a screwdriver.

FIG. 5 shows another variant for the clamping of the retainer 8 on the pad retainer bracket 7. The retainer 8 once again is arranged at one side on a side region of the pad retainer bracket 7 and held thereon by positive locking and/or friction locking, the signal cable 9 being led between the retainer 8 and an associated side of the pad retainer bracket 7.

Here, the clamping leg 11 is inserted in a groove 19 of the pad retainer bracket 7, so that likewise a positive locking and, in addition, a friction locking due to the insertion tapers of the clamping leg 11 is produced transversely to the longitudinal extension of the pad retainer bracket 7.

For the fixation of the signal cable 9 in the retainer 8, angled locking tabs 14 are provided on the lower side leg, which cooperate with clamping clips 20 especially evident in FIG. 8 to provide a permanent positioning of the signal cable 9 in the retainer 8.

Figure 6:
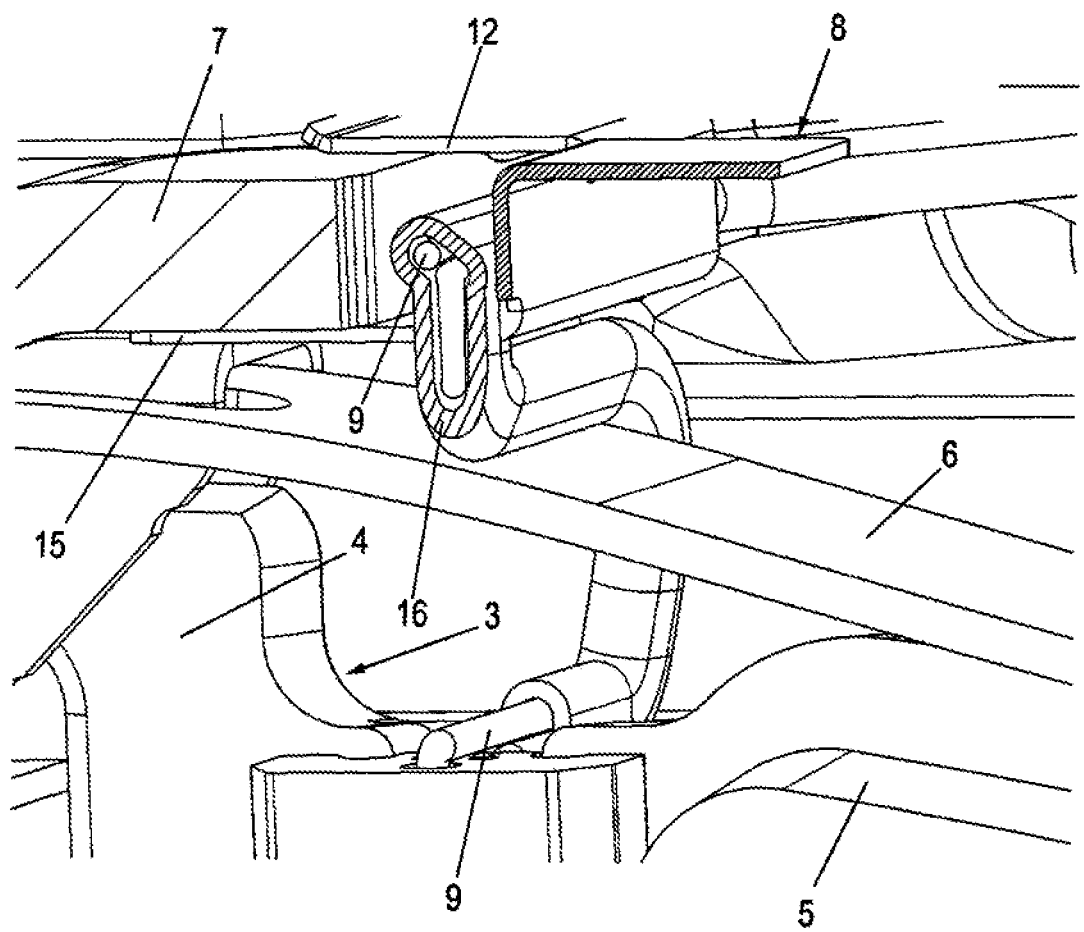
FIG. 6 is another exemplary embodiment of a retainer in the mounted position in a sectioned side view.

FIG. 6 shows an enlarged cut-out in a sectional side view of the installed retainer 8. It may be noticed here that the signal cable 9 is held in a flexible sheath 16, which is led in the interior space formed between the pad retainer bracket 7 and the retainer 8 and which forms a protection against damage for the signal cable 9.

Like FIG. 3, FIGS. 7 and 8 likewise show the retainer 8 prior to installation, i.e., prior to being pressed onto the pad retainer bracket 7.

In FIGS. 7 and 8, the retainer 8 may be recognized as a preassembled structural unit, wherein the retainer 8 has been fitted out with the signal cable 9 at the factory, so that this structural unit can be arranged functionally on the mounted pad retainer bracket 7.

As a further possibility for a positive locking of the retainer 8 with the pad retainer bracket 7, FIG. 8 shows that one of the side legs 12, 15, in the example the upper side leg 12, is provided with a hole 17, which engages with a pin 18 of the pad retainer bracket 7. The aforementioned insertion taper of the clamping leg 11 is provided for the pin 18 to travel over it during the installing of the retainer 8.

LIST OF REFERENCE NUMBERS

1 Brake caliper
2 Brake disc
3 Brake pad
4 Pad support plate
5 Friction pad
6 Pad retaining spring
7 Pad retainer bracket
8 Retainer
9 Signal cable
10 Mounting opening
11 Clamping leg
12 Upper side leg
13 Web
14 Locking tab
15 Lower side leg
16 Sheath
17 Hole
18 Pin
19 Furrow
20 Clamping clip The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A combination for securing at least one signal cable to a disc brake, comprising:
a pad retainer bracket of the disc brake; and
a securing device including a retainer in which the at least one signal cable is guided,
wherein
when in an installed position in the disc brake, the pad retainer bracket spans a least a portion of an opening of a caliper of the disc brake in a region at the opening which is radially outward of a brake disc and brake pads of the disc brake,
the pad retainer bracket includes a radially outer surface facing away from a rotation axis of the brake disc, and includes at least one groove parallel to a pad retainer bracket lateral side facing in a circumferential direction of the brake disc,
the retainer is configured to be arranged at the pad retainer bracket lateral side facing in the circumferential direction of the brake disc, and to support the at least one signal cable positioned laterally between a circumferential side of the retainer and the pad retainer bracket lateral side in the region radially outward of the brake disc and the brake pads,
when in the installed position, no portion of the brake pad retainer bracket either in or radially outward from the opening in the caliper is farther in the circumferential direction from a circumferential center of the pad retainer bracket than the retainer is from the circumferential center of the pad retainer bracket in the same circumferential direction, the retainer is configured to be retained on the pad retainer bracket by positive locking and/or friction locking at the pad retainer bracket lateral side facing in a circumferential direction of the brake disc by at least one clamping leg of the retainer extending in the circumferential direction and engaging the at least one groove of the pad retainer bracket.

2. The combination as claimed in claim 1, wherein
the retainer runs substantially parallel to a longitudinal direction of the pad retainer bracket and has areas which are U-shaped or C-shaped in cross section, forming an upper side leg and, running parallel to the upper leg at a distance therefrom, a lower side leg, which rest against the pad retainer bracket.

3. The combination as claimed in claim 2, wherein
the pad retainer bracket has a web at least at one side associated with the upper side leg or lower side leg, which web is grasped by the at least one clamping leg.

4. The combination as claimed in claim 2, wherein
the at least one clamping leg is configured as an insertion taper in its free edge region.

5. The combination as claimed in claim 2, wherein
locking tabs bent at an angle toward each other are provided on the upper and/or lower side leg, forming a side displacement barrier for the at least one signal cable.

6. The combination as claimed in claim 2, wherein
clamping clips are formed on the upper and/or lower side leg, for fixing the at least one signal cable.

7. The combination as claimed in claim 1, wherein
the retainer and the at least one signal cable are pre-assembled as a structural unit prior to installation on the caliper.

8. The combination as claimed in claim 1, wherein
the retainer is formed as a shaped sheet metal part.

9. The combination as claimed in claim 1, wherein
the pad retainer bracket has a substantially flattened shape in cross section perpendicular to its longitudinal direction, with two short sides and two long sides,
the longitudinal direction of the pad retainer bracket lies parallel with an axis of rotation of the brake disc, and
the at least one signal cable is led and secured between the retainer and an associated short side of the pad retainer bracket in cross section.

10. The combination as claimed in claim 9, wherein
the pad retainer bracket has a flat, rectangular shape.

* * * * *